June 16, 1936.   R. OPPENHEIM   2,044,123
ALKALI PRIMARY CELL WITH DEPOLARIZATION BY AIR
Filed Dec. 21, 1934
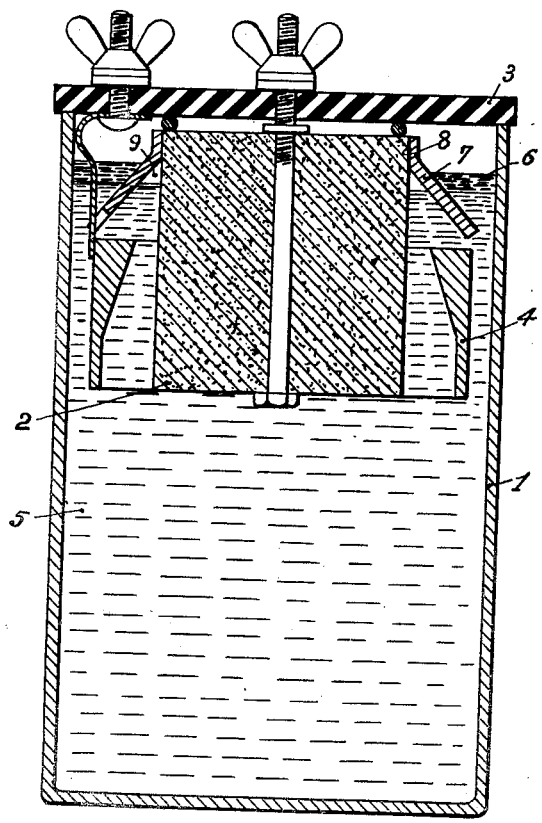
R. Oppenheim
INVENTOR
By: Glascock Downing Seebold
Attys.

Patented June 16, 1936

2,044,123

UNITED STATES PATENT OFFICE 2,044,123

ALKALI PRIMARY CELL WITH DEPOLARIZATION BY AIR

René Oppenheim, Gennevilliers, France, assignor to Societe Anonyme Le Carbone, Gennevilliers, France Application December 21, 1934, Serial No. 758,697
In France November 3, 1934

3 Claims. (Cl. 136—86)

In liquid primary cells of the alkali electrolyte type, it is common practice to cover the free surface of the solution with a layer of oil which is adapted to avoid the evaporation of the electrolyte and its conversion into carbonate, as well as the formation of creeping salts.

When the depolarization is ensured by a porous electrode which must be in communication with the air, and, in particular, by a porous carbon which extends above the surface of the electrolyte, special difficulties are encountered, owing to the fact that the oil can be rapidly absorbed by the carbon.

For avoiding this inconvenience, porous electrodes are usually surrounded, at the level of the surface of the solution, by a sleeve or collar which protects them against the contact of the oil.

This device is not however entirely satisfactory. In fact, the portion of the surface of the electrode which is protected by the collar is inactive and the efficiency of the cell is thus reduced.

Moreover, if the cell once assembled and the oil in place, the carbon is to be taken out of the solution, the oil trickles down along the surface, it can be more or less rapidly absorbed and then impair the operation of the element. This is in particular the case when the positive electrode capable of giving multiple discharges must be removed for allowing the renewal of the electrolyte and of the zinc element.

The present invention is adapted to remedy the inconveniences above mentioned. It substantially consists in providing the porous electrode with a protecting member having approximately the shape of a truncated cone or of a truncated pyramid, the small base of which is secured to the emerging portion of the porous electrode and the large base of which is located below the level of the oil. Preferably, the small base must exactly fit on the porous electrode and it must be sealed thereto so as to provide a practically air-tight joint. The large base will preferably have the shape and the greatest dimension consistent with its insertion in the jar of the primary cell.

The vertical section of the side wall of the protecting member can indifferently have the shape of two straight lines or of two curves of suitable profile.

The material constituting the protecting member must be such that it is not attacked by the electrolyte and the oil, or it can be covered with a varnish which is not attacked by the electrolyte and the oil.

If the said protecting member is so constructed as to allow contact (incidental or not) with the soluble electrode, it must be moreover made of insulating material, or covered with an insulating coating. Hard rubber having a low sulphur content is a material particularly suitable for the constitution of the protecting member.

By way of nonlimitative example, the accompanying drawing illustrates, in vertical section, a form of carrying the invention into practice.

In this drawing:

1 designates the jar of the primary cell;
2 the porous electrode secured to the cover or lid 3;
4 the zinc element also hung from the cover or lid 3;
5 the electrolyte covered with a layer of oil 6;
7 the protecting member forming the subject-matter of the invention, sealed at 8 to the positive electrode.

When the electrolyte is prepared, the lid 3 carrying both electrodes is placed in position. The level of the electrolyte being correct, that is to say higher than the large base of the protecting member, the oil is poured in and spreads over the surface outside the protecting member.

When it is necessary to renew the electrolyte, the lid 3 carrying the electrodes is removed. The oil trickles down on the protecting member and drips without soiling the positive electrode, provided the entire unit is held in an exactly vertical position.

It is to be noted that, owing to the packing 8, there is no circulation of air in the space 9 existing above the electrolyte and within the protecting member. The evaporation of the solution and its conversion into carbonate, as well as the formation of creeping salts, are not therefore to be feared. If desired, the carbon element can be surrounded at its upper part by a sleeve impervious to air, but, in order that the electrode should have the maximum efficiency, it is preferable that this sleeve should not extend below the level of the electrolyte.

It is to be noted that the shape of the protecting member is not necessarily, that of a truncated cone or of a truncated pyramid. It suffices that it forms a fluid-tight joint with the electrode above the liquid and that it should flare downwardly. Thus, the member can be more or less pleated, corrugated, etc. The profile of the flared portion can be rectilinear or curved.

The arrangements above described are of course given by way of example only; all constructional details, the shapes, dimensions and materials used can be varied according to circumstances without thereby departing from the scope of the invention.

I claim:

1. In primary cells, an alkali electrolyte, a porous electrode depolarized by air, said electrode being immersed in the electrolyte and extending above the surface thereof, a protecting member fitted in a fluid-tight manner on the porous electrode above the electrolyte, the said protecting member flaring downwardly and its lower part being immersed in the electrolyte, and a layer of oil on said electrolyte, said layer of oil being in contact with the protecting member and out of contact with the porous electrode.

2. In primary cells, an alkali electrolyte, a layer of oil on the said electrolyte, a porous electrode immersed in the electrolyte and extending above the surface thereof and the layer of oil, a protecting member in the shape of a truncated cone fitted in a fluid-tight manner on the porous electrode above the electrolyte and layer of oil, said protecting member flaring downwardly and having its lower part immersed in the electrolyte and acting to insulate the said electrode from the oil and preventing it from becoming wet by the oil when it is removed from the electrolyte.

3. In primary cells, an alkali electrolyte, a layer of oil on the said electrolyte, a porous electrode immersed in the electrolyte and extending above the surface thereof and the layer of oil, a protecting member in the shape of a truncated pyramid fitted in a fluid-tight manner on the porous electrode above the electrolyte and layer of oil, said protecting member flaring downwardly and having its lower part immersed in the electrolyte and acting to insulate the said electrode from the oil and preventing it from becoming wet by the oil when it is removed from the electrolyte.

RENÉ OPPENHEIM.